United States Patent
Lee et al.

(10) Patent No.: US 8,169,563 B2
(45) Date of Patent: May 1, 2012

(54) BACKLIGHT ASSEMBLY AND DISPLAY APPARATUS HAVING THE SAME

(75) Inventors: Joon-ik Lee, Chungcheongnam-do (KR); Sang-hee Lee, Suwon-si (KR); Jeong-seok Oh, Seoul (KR); Sang-min Yi, Suwon-si (KR); Jae-lok Cha, Goyang-si (KR); Ji-Hwan Jang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1017 days.

(21) Appl. No.: 12/122,970

(22) Filed: May 19, 2008

(65) Prior Publication Data
US 2008/0284939 A1    Nov. 20, 2008

(30) Foreign Application Priority Data

May 18, 2007 (KR) .................. 10-2007-0048861

(51) Int. Cl.
*G02F 1/1333* (2006.01)
(52) U.S. Cl. ............ 349/58; 349/65; 362/633; 362/97.2
(58) Field of Classification Search .................... 349/58, 349/65; 362/633, 632, 634, 97.1, 97.2
See application file for complete search history.

(56) References Cited

U.S. PATENT DOCUMENTS

| 7,679,694 B2 * | 3/2010 | Shirai ............................. 349/58 |
| 2007/0030867 A1 * | 2/2007 | Park et al. ........................ 372/22 |

FOREIGN PATENT DOCUMENTS

| KR | 1020000038537 | 7/2000 |
| KR | 1020060133685 | 12/2006 |

* cited by examiner

*Primary Examiner* — Thoi Duong
(74) *Attorney, Agent, or Firm* — Cantor Colburn LLP

(57) ABSTRACT

A backlight assembly includes a light source, a light-guide plate, a mold frame and a bottom chassis. The mold frame includes a first bottom portion, a protrusion on a first surface of the first bottom portion and a first sidewall portion on a second surface of the first bottom portion opposite to the first surface of the first bottom portion and facing the light guide plate. The bottom chassis includes a second bottom portion having a hole to receive the protrusion of the first bottom portion, and a second sidewall portion facing the light guide plate. A cross sectional area of a first opening of the hole corresponding to an inner surface of the bottom chassis and contacting the first surface of mold frame is different than a cross sectional area of a second opening of the hole corresponding to an outer surface of the bottom chassis.

18 Claims, 7 Drawing Sheets

BACKLIGHT ASSEMBLY AND DISPLAY APPARATUS HAVING THE SAME

This application claims priority to Korean Patent Application No. 10-2007-0048861, filed on May 18, 2007, and all the benefits accruing therefrom under 35 U.S.C. §119, the contents of which in its entirety are herein incorporated by reference.

BACKGROUND OF THE INVENTION

1. Field of the Invention

The present invention relates to a backlight assembly and a liquid crystal display ("LCD") apparatus and, more particularly, to a backlight assembly and an LCD apparatus having an improved binding force between a mold frame of the backlight assembly and a bottom chassis of the backlight assembly.

2. Description of the Related Art

In general, a liquid crystal display ("LCD") is a type of flat panel display device which displays images using liquid crystals. An LCD apparatus is widely used since the LCD is thinner, lighter and has a lower driving voltage and lower power consumption than many other display apparatuses. Since the LCD apparatus is not a self-emitting device, a backlight assembly including a light source is required.

More specifically, the LCD apparatus includes a light source which emits light, a light guide member which improves a luminance property of the light, and a mold frame and a bottom chassis containing the light source and the light guide member therein.

As demand for thinner backlight assemblies has increased, a containing member having the mold frame and the bottom chassis integrally formed therein has been developed. For example, the mold frame and the bottom chassis are integrally formed by an insert molding method which includes positioning the bottom chassis in a mold for the mold frame and then injecting a resin into the mold to form the containing member having the mold frame and the bottom chassis integrated therein. However, a gap between the mold frame and the bottom chassis forms and widens during the molding method, since the bottom chassis cannot withstand a distortion of the mold frame due to a difference in coefficients of thermal expansion between the mold frame and the bottom chassis.

BRIEF SUMMARY OF THE INVENTION

Exemplary embodiments of the present invention provide a backlight assembly having a strengthened binding force between a mold frame and a bottom chassis. Exemplary embodiments of the present invention also provide a liquid crystal display ("LCD") apparatus having the backlight assembly.

According to an exemplary embodiment of the present invention, a backlight assembly includes a light source, a mold frame and a bottom chassis.

The mold frame is disposed below the light source and has a first bottom portion, a protrusion on a first surface of the first bottom portion and a first sidewall portion on a second surface of the first bottom portion opposite to the first surface of the first bottom portion. The second surface of the first bottom portion faces the light source.

The bottom chassis includes a second bottom portion having a hole to receive the protrusion of the first bottom portion of the mold frame and a second sidewall portion facing the mold frame.

A first cross-sectional area of a first opening of the hole corresponding to an inner surface of the bottom chassis and contacting the first surface of mold frame is different than a second cross sectional area of a second opening of the hole corresponding to an outer surface of the bottom chassis.

The first cross-sectional area may be smaller than the second cross-sectional area.

A cross section of the hole may have a trapezoidal shape.

The hole may include a first interior side surface adjacent to the first opening of the hole, a second interior side surface adjacent to the second opening of the hole and a third interior side surface connecting the first interior side surface and the second interior side surface.

The first interior side surface is aligned in a first direction substantially perpendicular to a plane defined by the first opening of the hole, the third interior side surface is aligned in a second direction substantially perpendicular to the first direction and the second interior surface is aligned with one of the first direction and a third direction having an angle having a range from about 0 degrees to about 180 degrees with respect to the first direction.

The first interior surface may be aligned at an obtuse angle with respect to a plane defined by the first opening of the hole, the third interior side surface is aligned substantially parallel to the plane defined by the first opening of the hole and the second interior side surface is aligned at one of a right angle, an acute angle or an obtuse angle with respect to the third interior side surface.

A diameter of the first opening of the hole may be smaller than a diameter of the second opening of the hole.

The bottom chassis is integrally formed with the mold frame.

The first bottom portion of the mold frame may be in contact with an inner surface of the second bottom portion of the bottom chassis and an outer surface of the first sidewall portion may be in contact with an inner surface of the second sidewall portion of the bottom chassis.

The first bottom portion of the mold frame may be in contact with an inner surface of the second bottom portion of the bottom chassis and a part of the second sidewall portion of the bottom chassis may be inserted into the first sidewall portion of the mold frame.

The hole may be formed adjacent to the light source.

In an alternative exemplary embodiment of the present invention, a backlight assembly includes a light source, a mold frame disposed below the light source and a bottom chassis disposed below the mold frame.

The mold frame may have a substantially quadrangular shape and include a protrusion on an outer surface.

The bottom chassis includes a bottom portion having a hole and a sidewall extending from the bottom portion toward the mold frame.

The hole receives the protrusion and the protrusion has a stopper to prevent a separation of the protrusion from the hole.

The bottom chassis is integrally formed with the mold frame. Further, the bottom chassis covers the mold frame.

A part of the sidewall portion of the bottom chassis is inserted into the mold frame.

According to still another exemplary embodiment of the present invention, a backlight assembly includes a light source, a mold frame disposed below the light source and a bottom chassis disposed below the mold frame.

The mold frame has a substantially quadrangular shape and a protrusion on an outer surface, and the bottom chassis has a bottom portion covering a rear surface of the mold frame and a sidewall portion extending from the bottom portion toward the mold frame.

The sidewall portion has a hole to receive the protrusion, and a first cross sectional area of a first opening of the hole corresponding to an inner surface of the bottom chassis and contacting the mold frame is different than a second cross sectional area of a second opening of the hole corresponding to an outer surface of the bottom chassis.

A display panel is disposed above the light-guide plate to display an image using a light supplied from the light source.

According to another alternative exemplary embodiment of the present invention, a display apparatus includes a light source, a mold frame disposed below the light source, a bottom chassis and a display panel disposed above the mold frame.

The mold frame has a first bottom portion, a protrusion on a first surface of the first bottom portion and a first sidewall portion on a second surface of the first bottom portion opposite to the first surface of the first bottom portion. The second surface of the first bottom portion faces the light source.

The bottom chassis includes a second bottom portion having a hole to receive the protrusion of the first bottom portion of the mold frame and a second sidewall portion facing the mold frame.

The display panel disposed above the light source displays an image using a light supplied from the light source.

A first cross sectional area of a first opening of the hole corresponding to an inner surface of the bottom chassis and contacting the first surface of the mold frame is different than a second cross sectional area of a second opening of the hole corresponding to an outer surface of the bottom chassis.

In yet another alternative exemplary embodiment of the present invention, a display apparatus includes a light source, a mold frame, a bottom chassis and a display panel.

The mold frame is disposed below the light source and has a substantially quadrangular shape and a protrusion on an outer surface.

The bottom chassis is disposed below the mold frame, and has a bottom portion including a hole and a sidewall portion extending from the bottom portion toward the mold frame.

The display panel is disposed above the light source and displays an image using a light supplied from the light source.

The hole receives the protrusion, the protrusion having a stopper to prevent a separation of the protrusion from the hole.

In yet another alternative exemplary embodiment of the present invention, a display apparatus includes a light source, a mold frame disposed below the light source, a bottom chassis disposed below the mold frame, and a display panel disposed above the light source to display an image using a light supplied from the light source.

The mold frame has a substantially quadrangular shape and a protrusion on an outer surface.

The bottom chassis has a bottom portion covering a rear surface of the mold frame and a sidewall portion extending from the bottom portion toward the mold frame.

The sidewall portion has a hole to receive the protrusion, and a first cross sectional area of a first opening of the hole corresponding to an inner surface of the bottom chassis and contacting the mold frame is different than a second cross sectional area of a second opening of the hole corresponding to an outer surface of the bottom chassis.

BRIEF DESCRIPTION OF THE DRAWINGS

The above and other aspects, features and advantages of the present invention will become more readily apparent by describing in further detail exemplary embodiments thereof with reference to the accompanying drawings, in which.

DETAILED DESCRIPTION OF THE INVENTION

Figure 1:
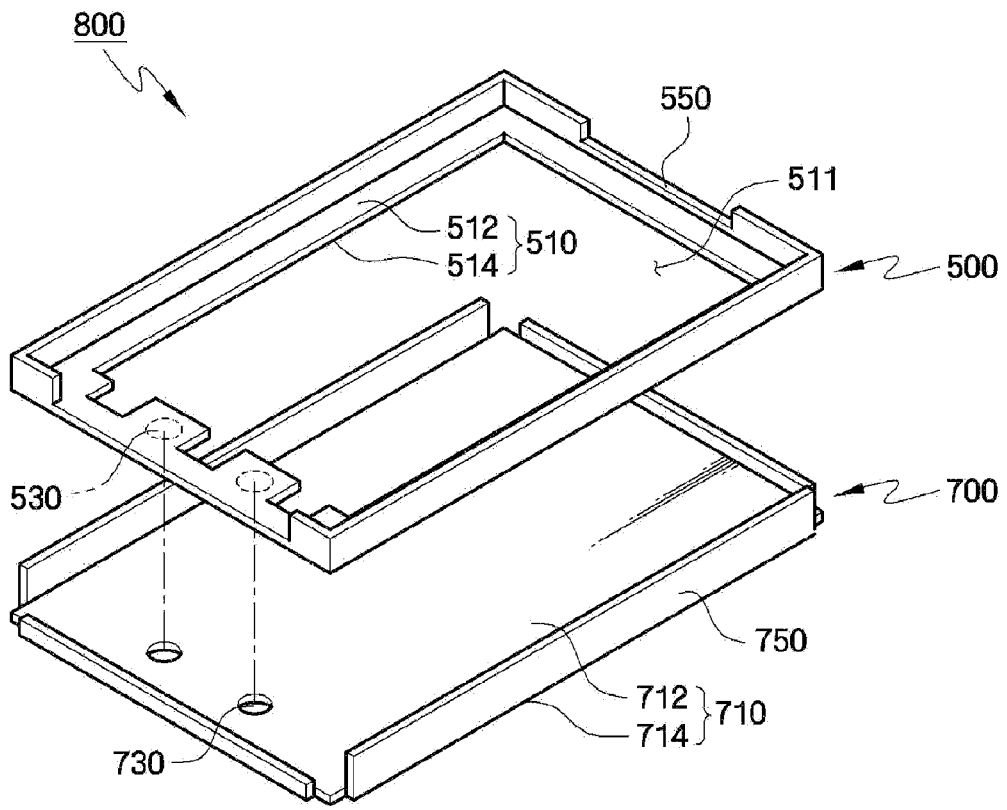
FIG. 1 is an exploded top perspective view illustrating a containing member of a backlight assembly according to an exemplary embodiment of the present invention.

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, the exemplary embodiments of the present invention will be explained in further detail with reference to the accompanying drawings.

Figure 2:
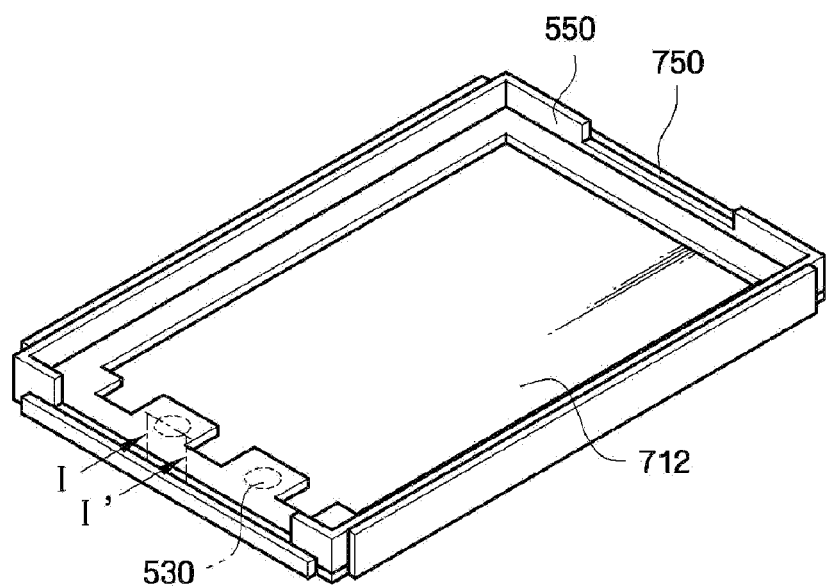
FIG. 2 is a top perspective view illustrating the containing member of the backlight assembly according to the exemplary embodiment of the present invention in FIG. 1.
Figure 3:
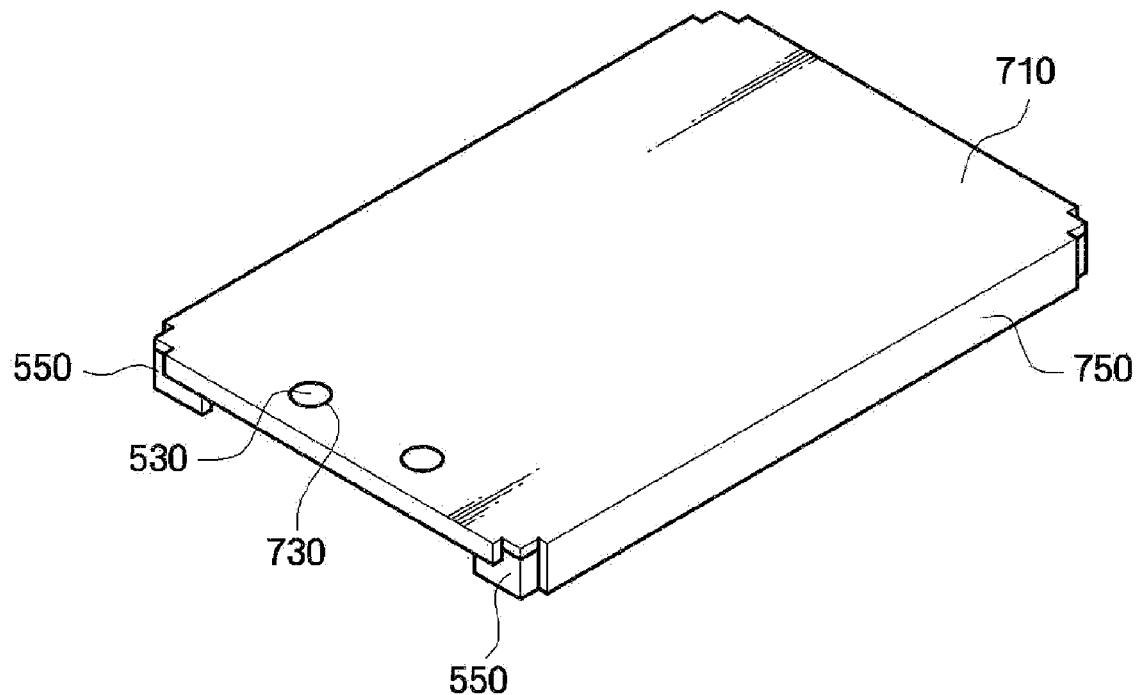
FIG. 3 is a bottom perspective view illustrating the containing member of the backlight assembly according to the exemplary embodiment of the present invention in FIG. 1.

FIG. 1 is an exploded top perspective view illustrating a containing member of a backlight assembly according to an exemplary embodiment of the present invention, FIG. 2 is a top perspective view illustrating the containing member of the backlight assembly according to the exemplary embodiment of the present invention in FIG. 1, and FIG. 3 is a bottom perspective view illustrating the containing member of the backlight assembly according to the exemplary embodiment of the present invention in FIG. 1. For convenience of illustration, a mold frame and a bottom chassis are separated as shown in FIG. 1, but in exemplary embodiments, they are integrally formed by an insert-molding, as shown in FIGS. 2 and 3.

Referring to FIGS. 1 through 3, a containing member 800 of a backlight assembly (not shown) according to an exemplary embodiment of the present invention includes a mold frame 500 and a bottom chassis 700.

As shown in FIG. 1, the mold frame 500 has a substantially quadrangular shape and includes a first bottom portion 510 having an opening 511, and a first sidewall portion 550 having four sidewalls (not labeled) extending in an upward direction from an outer peripheral edge of the first bottom portion 510.

The first bottom portion 510 includes a first inner bottom surface 512 and a first outer bottom surface 514. The first outer bottom surface 514 includes a protrusion 530 with a cross section having a substantially circular shape protruding in a downward direction, e.g., in a direction opposite to the upward direction in which the four sidewalls extend from the outer peripheral edge of the first bottom portion 510, as shown in FIG. 1. The protrusion 530 (shown by a broken line in FIGS. 1 and 2) corresponds to a hole 730 formed in the bottom chassis 700.

The four sidewalls of the first sidewall portion 550 extending from an outer peripheral edge of the first bottom portion 510 in the upward direction have different heights, as shown in FIGS. 1 and 2.

The mold frame 500 is made of a plastic material including, for example, polycarbonate ("PC"), but is not limited thereto.

The bottom chassis 700 includes a second bottom portion 710 and a second sidewall portion 750.

The second bottom portion 710 further includes a second inner bottom surface 712 and a second outer bottom surface 714, and the hole 730 which receives the protrusion 530 is formed in the second bottom portion 710, as shown in FIG. 1.

The hole 730 may have a substantially circular-shaped cross section, but is not limited thereto in alternative exemplary embodiments of the present invention.

Referring to FIGS. 2 and 3, when the first bottom portion 510 of the mold frame 500 and the second bottom portion 710 of the bottom chassis 700 are combined, the protrusion 530 of the mold frame 500 and the hole 730 are combined.

In an exemplary embodiment, the bottom chassis 700 is made of a metal stronger than a material of the mold frame, including stainless steel, for example, but not being limited thereto.

The first bottom portion 510 of the mold frame 500 and the second bottom portion 710 of the bottom chassis 700 are disposed directly on each other. More specifically, the first bottom portion 510 of the mold frame 500 and the second bottom portion 710 of the bottom chassis 700 are combined, e.g., integrated, by a molding process. Likewise, an outer surface of the first sidewall portion 550 of the mold frame 500 and an inner surface of the second sidewall portion 750 of the bottom chassis 700 are directly and integrally on each other, e.g., are combined by the molding process.

A contact area between the mold frame 500 and the bottom chassis 700 is increased, relative to a contact area of a mold frame and a bottom chassis of a backlight assembly of the prior art, by means of the combination, described above in greater detail, of the hole 730 formed in the second bottom portion 710 of the bottom chassis 700 and the protrusion 530 of the mold frame 500. Therefore, a binding force between the mold frame 500 and the bottom chassis 700 is effectively strengthened, thereby effectively improving reliability of the containing member 800 of the backlight assembly according to an exemplary embodiment of the present invention.

In alternative exemplary embodiments of the present invention, a location of the hole 730 and the protrusion 530 may be varied from that shown in FIGS. 1 through 3. Furthermore, the cross section of the hole 730 may have various shapes including a circle and a quadrangle, for example, but is not limited thereto in alternative exemplary embodiments.

The containing member 800 described above can be manufactured by an insert-molding technology.

In the insert molding technology, the bottom chassis 700 having the hole 730 in the second bottom portion 710 is positioned in a mold for the mold frame 500, and a resin is injected into the mold. An adhesive agent is coated on the bottom chassis 700 to improve adhesion between the bottom chassis and the resin. After the resin solidifies, the mold is removed and the mold frame 500 and the bottom chassis 700 are thereby integrated. More specifically, the resin is injected into the hole 730 and, as a result, the at leas one protrusion 530 corresponding to the hole 730 is formed in the mold frame 500.

Thus, as described above, a contact area between the mold frame 500 and the bottom chassis 700 is thereby increased by a combination of the hole 730 and the protrusion 530. Therefore, a binding force between the mold frame 500 and the bottom chassis 700 is effectively strengthened.

Various structures of the hole 730 increasing a contact area between the bottom chassis 700 and the mold frame 500 according to alternative exemplary embodiments of the present invention will hereinafter be described in further detail with reference to the accompanying drawings.

Figure 4:
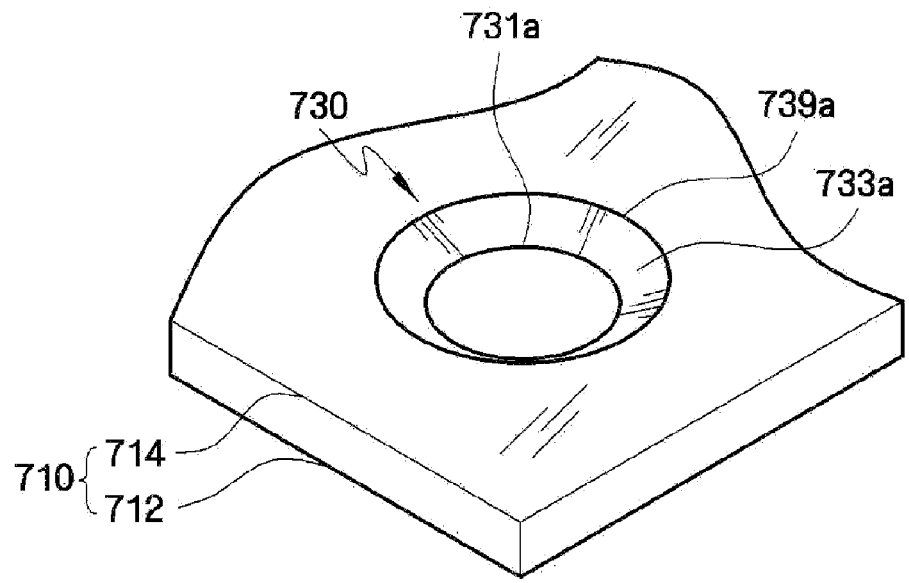
FIG. 4 is an enlarged partial bottom perspective view illustrating a hole of a bottom chassis of the backlight assembly according to the exemplary embodiment of the present invention in FIG. 3.
Figure 5:
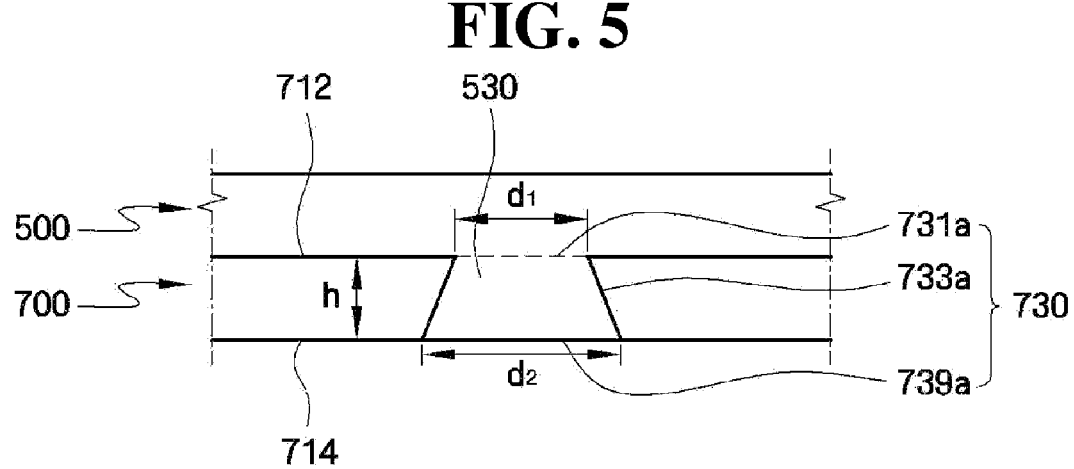
FIG. 5 is a partial cross-sectional view take along line I-I' of the containing member of the backlight assembly according to the exemplary embodiment of the present invention in FIG. 2.

FIG. 4 is an enlarged partial bottom perspective view illustrating a hole of a bottom chassis of the backlight assembly according to the exemplary embodiment of the present invention in FIG. 3, and FIG. 5 is a partial cross-sectional view take along line I-I' of the containing member of the backlight assembly according to the exemplary embodiment of the present invention in FIG. 2.

Referring to FIG. 4, the hole 730 includes a first open area 731a formed in the second inner bottom surface 712, a second open area 739a formed in the second outer bottom surface 714, and a first side surface 733a connecting the first open area 731a and the second open area 739a.

Referring to FIG. 5, a first inside diameter $d_1$ of the first open area 731a is different from a second inside diameter $d_2$ of the second open area 739a, e.g., the first diameter $d_1$ is less than the second diameter $d_2$. As a result, a contact area between the bottom chassis 700 and the protrusion 530 of the mold frame 500 is increased without changing a height h of the hole, and a binding force between the mold frame 500 and the bottom chassis 700 is thereby strengthened.

Still referring to FIG. 5, a cross section of the hole 730 has a trapezoid shape. More specifically, the cross section of the hole 730 is defined by a plane of the first open area 731a, a plane of the second open area 739a longer than the plane of the first open area 731a, and corresponding opposite planes of the first side surface 733a connecting respective planes of the first open area 731a and the second open area 739a, as shown in FIG. 5. In alternative exemplary embodiments of the present invention, the cross section of the hole 730 is not limited to the trapezoid shape. Further, the first diameter $d_1$ may be greater than the second diameter $d_2$ in alternative exemplary embodiments, but a relationship between the first diameter $d_1$ and the second diameter $d_2$ is not limited thereto.

The protrusion 530 is formed in the mold frame 500 to correspond to the shape of the hole 730, as described above in greater detail.

A hole 730b and a protrusion 530b formed to have a flange shape according to an alternative exemplary embodiment of the present invention will now be described in further detail with reference to FIGS. 6A and 6B. More specifically, the hole 730 having the flange shape includes a first inside diameter of a first open area formed on an inner bottom surface and at least one second inside diameter of a second open area formed on an outer bottom surface, wherein the second inside diameter is different from the first inside diameter, as will be described in further detail below with reference to FIG. 6A. By adopting a shape described above, a binding force between the mold frame 500 and the bottom chassis 700 is further effectively strengthened.

Figure 6A:
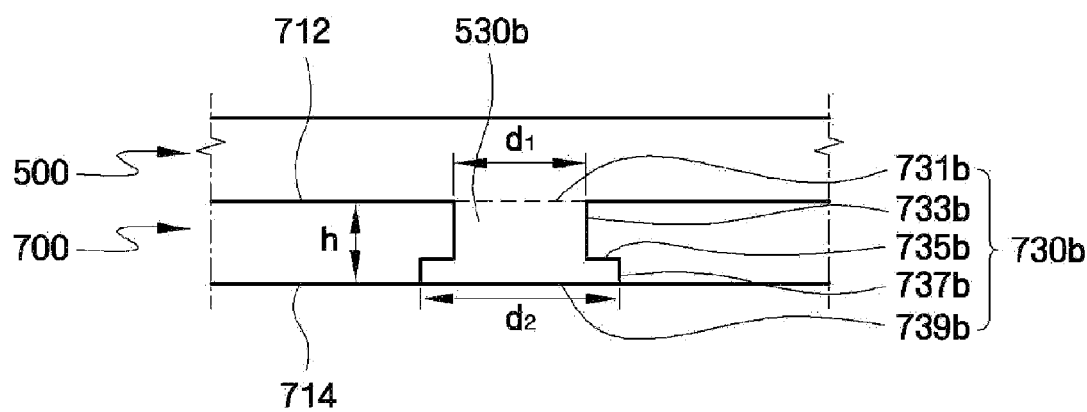
FIG. 6A is a partial cross-sectional view illustrating a containing member of a backlight assembly according to an alternative exemplary embodiment of the present invention.

FIG. 6A is a partial cross-sectional view illustrating a containing member of a backlight assembly according to an alternative exemplary embodiment of the present invention. FIG. 6B is an enlarged partial bottom perspective view illustrating a hole of a bottom chassis of the containing member of the backlight assembly according to the alternative exemplary embodiment of the present invention in FIG. 6A.

Figure 6B:
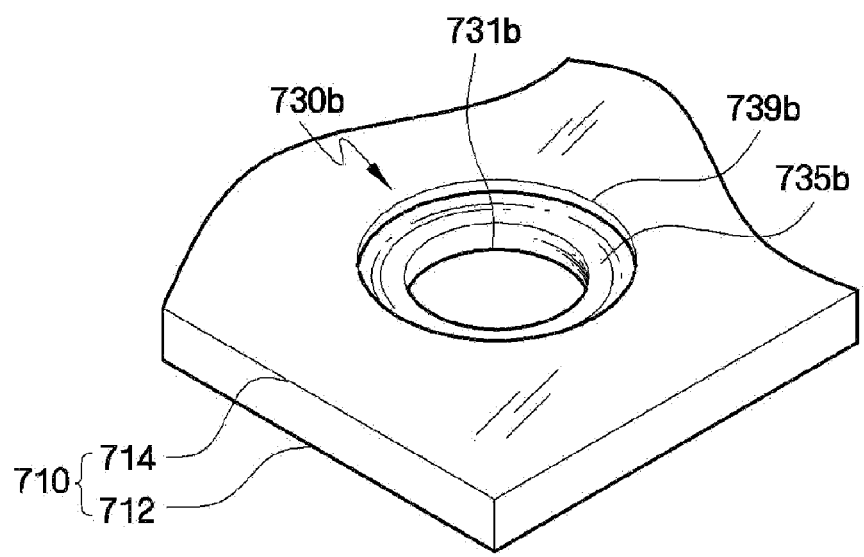
FIG. 6B is an enlarged partial bottom perspective view illustrating a hole of a bottom chassis of the containing member of the backlight assembly according to the alternative exemplary embodiment of the present invention in FIG. 6A.

Referring to FIGS. 6A and 6B, a first open area 731b and a second open area 739b are connected by a first side surface 733b, a second side surface 735b and a third side surface 737b. This structure further increases a contact area of the hole 730b with a protrusion 530b as compared to the exemplary embodiment of the present invention described above in reference to FIGS. 4 and 5, thereby further preventing the mold frame 500 from separating from the bottom chassis 700.

More specifically, referring to FIG. 6A, the hole 730b includes the first open area 731b formed in the second inner bottom surface 712, the second open area 739b formed in the second outer bottom surface 714. Further, a first inside diameter $d_1$ of the first open area 731b is different from a second inside diameter $d_2$ of the second open area 739b, e.g., the first diameter $d_1$ is less than the second diameter $d_2$. As a result, a contact area between the bottom chassis 700 and the mold frame 500 is increased without changing a height h of the hole 730b, and a binding force between the mold frame 500 and the bottom chassis 700 is thereby effectively strengthened.

A cross section of the hole 730b is defined by respective planes parallel to each of the first open area 731b, the second open area 739b, the first side surface 733b, the second side surface 735b and the third side surface 737b.

The protrusion 530b of the mold frame 500 is formed corresponding to the hole 730b. The third side surface 737b and the second side surface 735b form a right angle, effectively acting as a stopper which prevents the protrusion 530b from moving in the in the upper direction (FIG. 1) and separating from the hole 730b.

In alternative exemplary embodiments of the present invention, the cross section of the hole 730b may have a different shape than as described above. For example, the third side surface 737b may be angled to form an angle which is not a right angle with the second side surface 735b, but is not limited thereto.

Figure 7A:
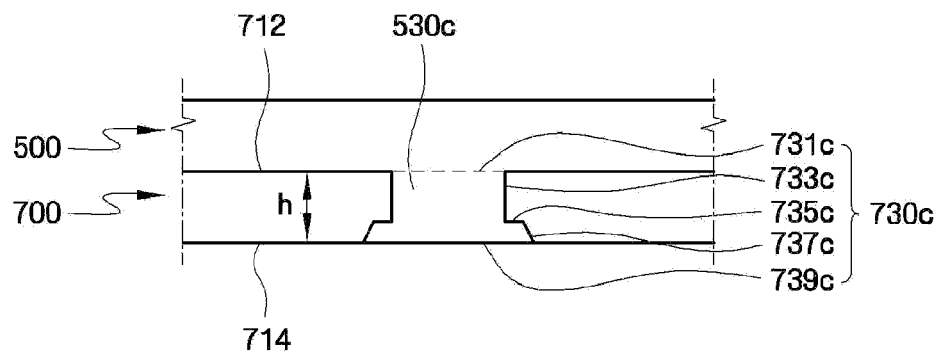
FIGS. 7A, 7B and 7C are partial cross-sectional views illustrating alternative exemplary embodiments of the containing member of the backlight assembly according to the alternative exemplary embodiment of the present invention in FIG. 6A.
Figure 7B:
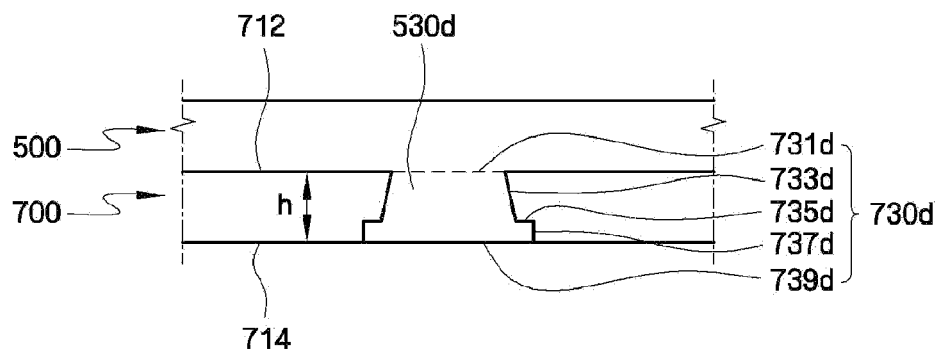
Figure 7C:
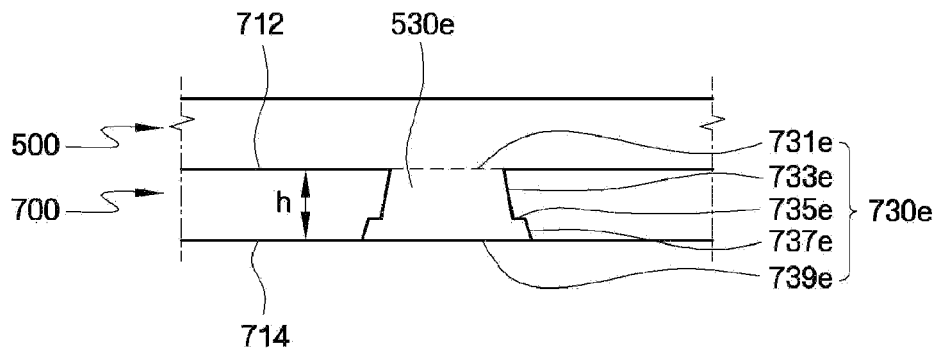

FIGS. 7A through 7C are partial cross-sectional views illustrating alternative exemplary embodiments of the containing member of the backlight assembly according to the alternative exemplary embodiment of the present invention in FIG. 6A.

Referring to FIG. 7A, a third side surface 737c of a hole 730c extends obliquely from a second open area 739c to a second side surface 735c. The second open area 739c is larger than the second open area 739b as described in FIG. 6A, since the third side surface 737c is formed at an acute angle toward the second open area 739c, as shown in FIG. 7A. Therefore, a contact area of the hole 730c with a protrusion 530c is effectively increased.

A first open area 731c and a first side surface 733c are substantially the same as the first open area 731b and the first side surface 733b, respectively, shown in FIG. 6A.

In an exemplary embodiment, the third side surface 737c is formed at an obtuse angle with respect to the second outer bottom surface 714.

In alternative exemplary embodiments, the third side surface 737c may be formed at an obtuse angle with respect to the second open area 739c.

Referring to FIG. 7B, a first side surface 733d extends obliquely from a first open area 731d. The first side surface 733d is longer than the first side surface 733b of FIG. 6A due to forming the first side surface 733d at an obtuse angle to the first open area 731d. Therefore, a contact area of a hole 730d with a protrusion 530d is thereby increased.

A second open area 739d, a third side surface 737d and a second side surface 735d are substantially the same as the second open area 739b, the third side surface 737b and the second side surface 735b, respectively, shown in FIG. 6A.

In an exemplary embodiment, the first side surface 733d is formed at an acute angle with respect to the second inner bottom surface 712.

In an alternative exemplary embodiment, the first side surface 733d may be formed at an acute angle to the first open area 731d.

Referring to FIG. 7C, a first side surface 733e extends obliquely from a first open surface 731e and a third side surface 737e extends obliquely from a second open area 739e.

The first side surface 733e and the third side surface 737e become longer by forming the first side surface 733e and the third side surface 737e at a slant, e.g., an oblique angle, as shown in FIG. 7C. Therefore, a contact area of a hole 730e with a protrusion 530e is effectively increased.

A second side surface 735e is substantially the same as the second side surface 735d in FIG. 7B.

Figure 8:
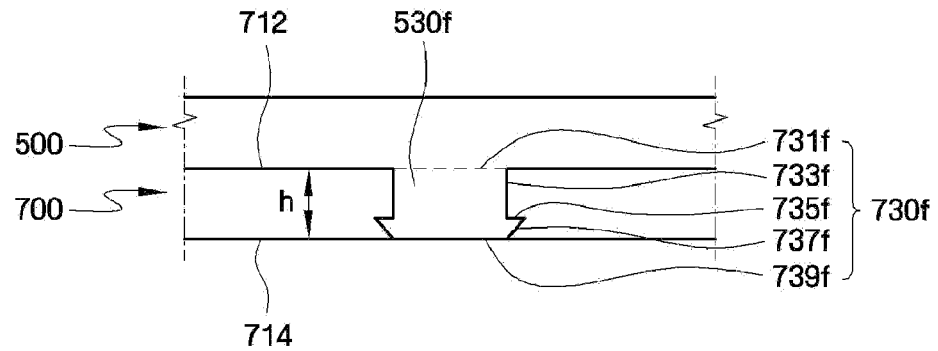
FIG. 8 is a partial cross-sectional view illustrating a containing member of a backlight assembly according to yet another exemplary embodiment of the present invention.

FIG. 8 is a partial cross-sectional view illustrating a containing member of a backlight assembly according to yet another alternative exemplary embodiment of the present invention.

Referring to FIG. 8., a protrusion 530f of the mold frame 500 is formed corresponding to hole 730f, and the third side surface 737f and the second side surface 735f connected to the first side surface 733f form an acute angle, effectively acting as a stopper between the first open area 731f and the second open area 739, thereby effectively preventing the protrusion 530f from moving in the in the upper direction (FIG. 1) and thereby separating from the hole 730f.

Thus, a binding force between the mold frame 500 and the bottom chassis 700 are strengthened.

Figure 9:
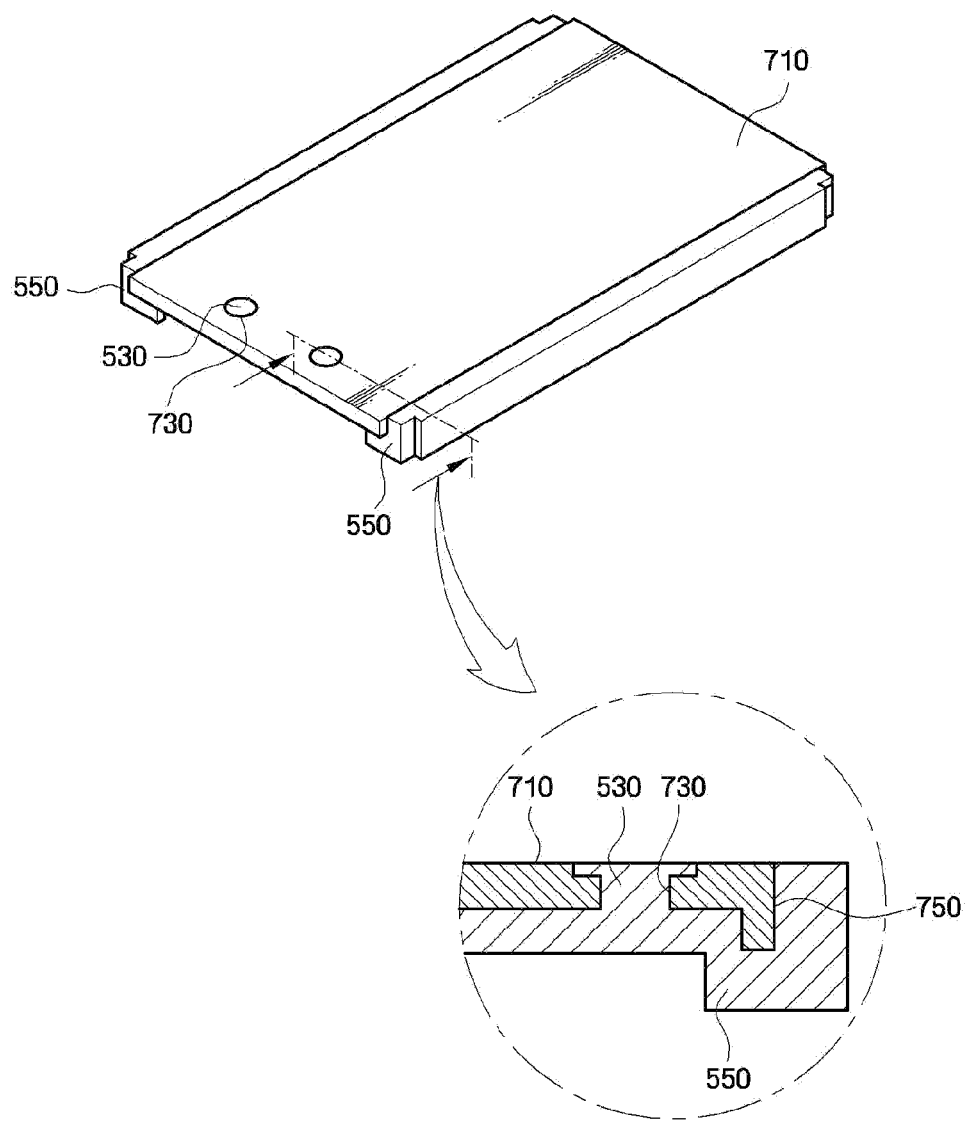
FIG. 9 is a bottom perspective view illustrating a containing member of a backlight assembly according to still another alternative exemplary embodiment of the present invention.

FIG. 9 is a bottom perspective view illustrating a containing member of a backlight assembly according to another exemplary embodiment of the present invention. Components having the same or similar functions as components described above with respect to exemplary embodiments shown in FIGS. 1 through 8 are identified by the same reference numerals, and repetitive descriptions thereof are omitted below.

Referring to FIGS. 1 and 9, the second sidewall portion 750 of the bottom chassis 700 is inserted into the first sidewall portion 550 of the mold frame 500.

Figure 10:
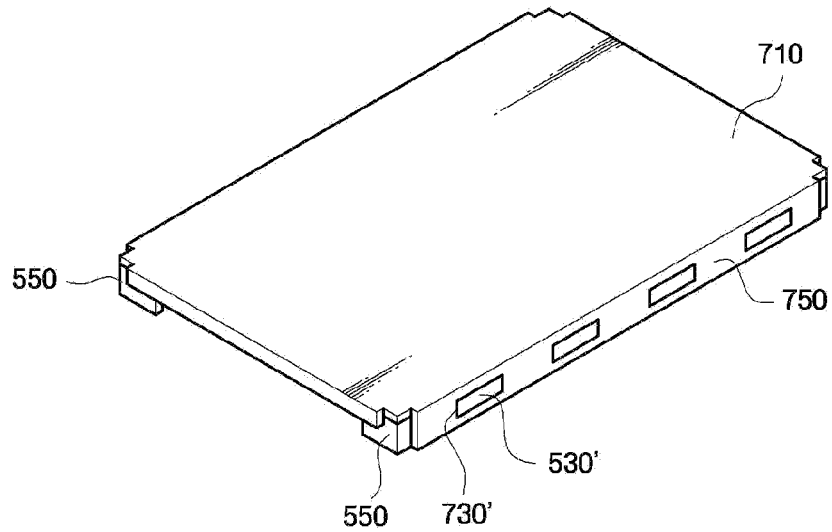
FIG. 10 is a bottom perspective view illustrating a containing member of a backlight assembly according to another alternative exemplary embodiment of the present invention.

FIG. 10 is a bottom perspective view illustrating a containing member of a backlight assembly according to another alternative exemplary embodiment of the present invention. Components having the same or similar functions as components described above with respect to exemplary embodiments shown in FIGS. 1 through 8 are identified by the same reference numerals, and repetitive descriptions thereof are omitted below.

Referring to FIGS. 1, 2 and 10, a hole 730' is formed in the second sidewall portion 750 of the bottom chassis 700, and the mold frame 500 includes a protrusion 530' corresponding to the hole 730'.

A cross section of the hole 730' has a substantially quadrangle shape, and the protrusion 530' has a shape corresponding to the shape of the cross section of the hole 730', e.g., also has a substantially quadrangle shape. In alternative exemplary embodiments, the hole 730' and the protrusion 530' may have alternative shapes such as a shape of a circle, for example, but are not limited thereto.

Figure 11:
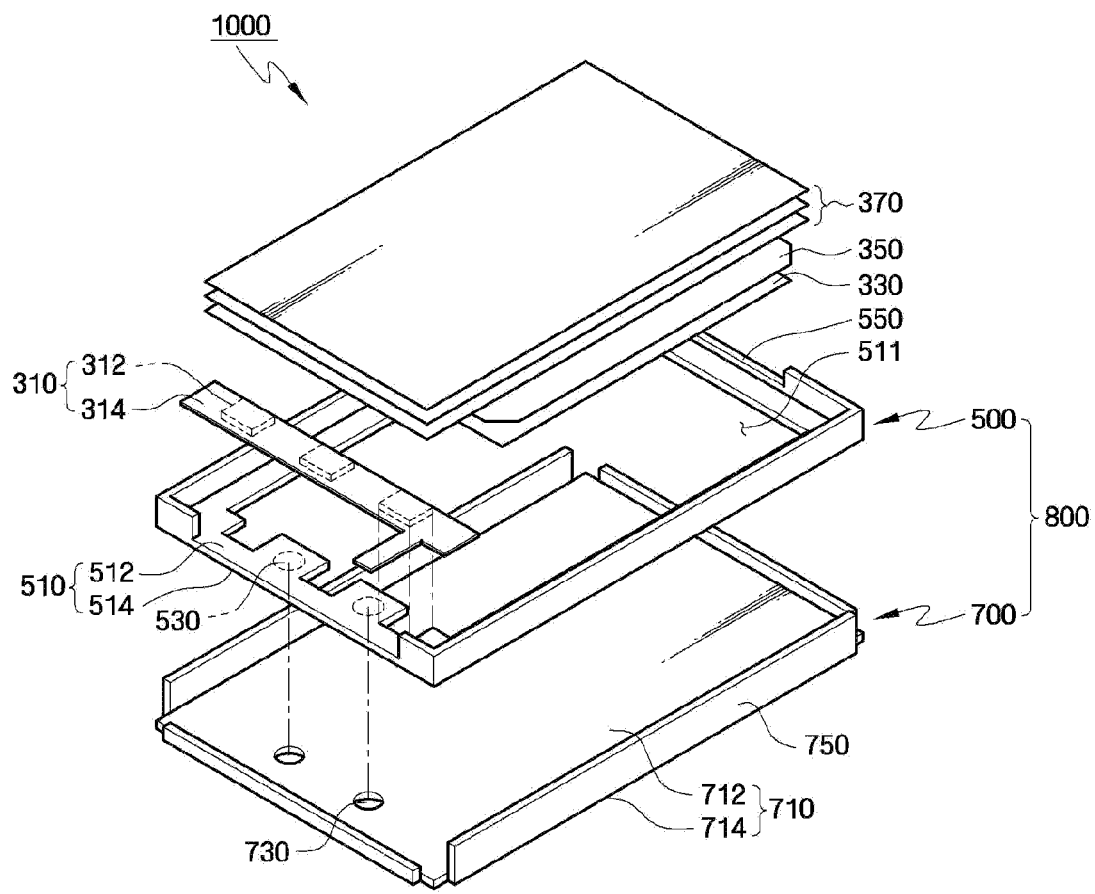
FIG. 11 is an exploded perspective view illustrating a backlight assembly according to an exemplary embodiment of the present invention.

FIG. 11 is an exploded perspective view illustrating a backlight assembly according to an exemplary embodiment of the present invention.

Referring to FIG. 11, a backlight assembly 1000 according to an exemplary embodiment of the present invention includes a light-supply unit 310, a reflection sheet 330, a light-guide plate 350, optical sheets 370 and a containing member 800.

The light-supply unit 310 generates light to display an image. The light-supply unit 310 includes light source 312 which emits light and a printed circuit board 314 which provides a driving signal to the light source 312. The light source 312 includes at least one light emitting diode ("LED") (not shown), and, in alternative exemplary embodiments, the light source 312 includes a plurality of LEDs having a number of individual LEDs according to a size of the panel and a required luminance. Thus, the LED may be effectively used as a light source, for example, but alternative exemplary embodiments are not limited to LEDs as a light source.

The light-guide plate 350 is disposed adjacent to the light source 312, as shown in FIG. 11, and guides light emitted from the light source 312. To minimize loss of light emitted from the light source 312, the light-guide plate 350 is formed of a transparent material including, for example, high strength polymethylmethacrylate ("PMMA"), but is not limited thereto.

The reflection sheet 330 is disposed below the light-guide plate 350, and reflects light leaking out through a lower surface of the light-guide plate 350 toward the light-guide plate 350, thereby reducing light loss.

The optical sheets 370 improve a luminance property of light emitted from the light-guide plate 350. The optical sheets 370 may include a diffusion sheet (not shown) which disperses light emitted from the light-guide plate 350 and a prism sheet (not shown) which condenses the light emitted from the light-guide plate 350 in a direction substantially perpendicular to a planar surface of the light-guide plate 350.

The containing member 800 receives the light-supply unit 310, the reflection sheet 330, the light-guide plate 350, and the optical sheets 370.

A hole 730 of the containing member 800 is formed in a light-admitting area having the light source 312 disposed therein. Since the light source 312 is disposed in the light-admitting area, a contact area between a mold frame 500 and a bottom chassis 700 is reduced in the light-admitting area compared with other areas between the mold frame 500 and the bottom chassis 700. Consequently, a binding force between the mold frame 500 and the bottom chassis 700 is reduced in the light-admitting area compared with other areas between the mold frame 500 and the bottom chassis 700. As described in greater detail above, the hole 730 increases the contact area and thus increases the binding force between the mold frame 500 and the bottom chassis 700.

Figure 12:
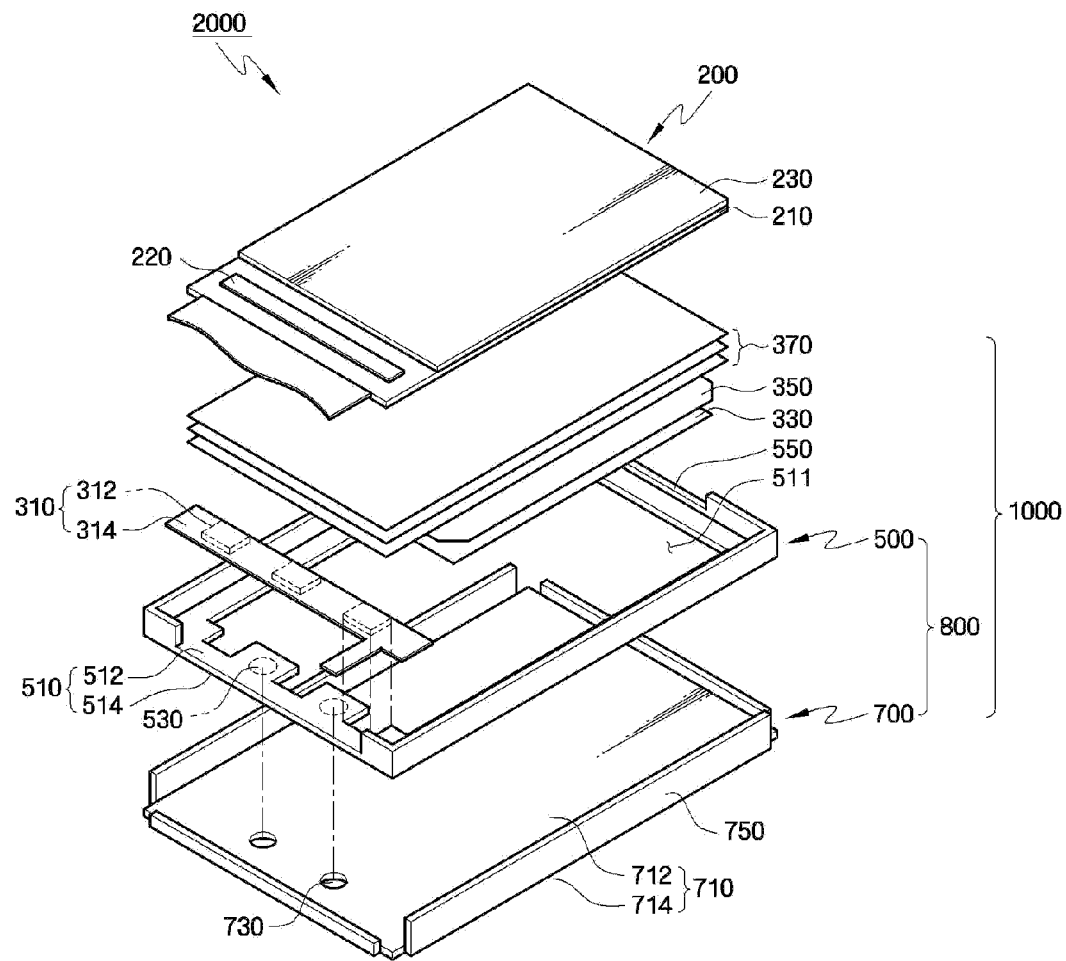
FIG. 12 is an exploded perspective view illustrating a liquid crystal display apparatus according to an exemplary embodiment of the present invention.

FIG. 12 is an exploded perspective view illustrating a liquid crystal display apparatus according to an exemplary embodiment of the present invention. Components having the same or similar function as described in connection with FIG. 10 are identified by the same reference numerals, and their description will not be repeated.

Referring to FIG. 12, the LCD apparatus 2000 includes the backlight assembly 1000 described above in reference to FIG. 11 and an LCD panel 200 which displays an image using light provided from the backlight assembly 1000.

The LCD panel 200 includes a lower substrate 210, an upper substrate 230 opposite to the lower substrate 210, a liquid crystal layer (not shown) interposed between the lower substrate 210 and the upper substrate 230 and driving chips 220 disposed on the lower substrate 210.

The lower substrate 210 includes a transparent substrate (not shown), such as glass, for example, having an array of thin film transistors ("TFTs") (not shown) used as switching elements disposed in a substantially matrix pattern thereon. A source terminal and a gate terminal of each TFT are connected to a data line (not shown) and a gate line (not shown), respectively, and a drain terminal of the TFT is connected to a pixel electrode (not shown) made of transparent conductive material, for example.

The upper substrate 230 includes a color filter (not shown) representing a red, green, or blue color, for example, and a common electrode (not shown) opposite to the pixel electrode of the lower substrate 210. In alternative exemplary embodiments, the color filter may be formed on the lower substrate 210.

The liquid crystal layer (not shown) interposed between the lower substrate 210 and the upper substrate 230 includes liquid crystal molecules having electrical and optical properties such as dielectric anisotropy and refractive anisotropy, for example. In an exemplary embodiment, the liquid crystal layer includes liquid crystal molecules with a twisted nematic orientation, wherein the liquid crystal molecules are tilted at a predetermined angle by an electric field generated between the pixel electrode and the common electrode.

The driving chips 220 generate driving signals to drive the LCD panel 200 in response to various control signals. For example, the driving chips 220 are electrically connected to the lower substrate 210 through an anisotropic conductive film ("ACF").

With respect to the liquid crystal display panel 200, when a signal is applied to the gate terminal of the TFT, the TFT is turned-on and an electric field is generated between the pixel electrode and the common electrode. As a result, the liquid crystal molecules of the liquid crystal layer disposed between the lower substrate 210 and the upper substrate 230 are rearranged and thus a transmittance of light is controlled according to the rearranged liquid crystal molecules, thereby displaying a desired image.

According to exemplary embodiments of the present invention, the backlight assembly and the LCD apparatus having the same include the bottom chassis 700 with the hole 730 and the mold frame 500 with the protrusion integrally forming a containing member. As a result, a contact area between the bottom chassis 700 and the mold frame 500 increases, thereby strengthening a binding force between the bottom chassis 700 and the mold frame 500.

In addition, cross sections of each of the hole 730 and the protrusion 530 are formed such that the hole 730 and the protrusion 530 function essentially as a stopper to further prevent the mold frame 500 from separating from the bottom chassis 700.

The present invention should not be construed as being limited to the exemplary embodiments set forth herein. Rather, these exemplary embodiments are provided so that this disclosure will be thorough and complete and will fully convey the concept of the present invention to those skilled in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A backlight assembly comprising:
   a light source;
   a mold frame disposed below the light source and having a first bottom portion, a protrusion on a first surface of the first bottom portion and a first sidewall portion on a second surface of the first bottom portion opposite to the first surface of the first bottom portion, the second surface of the first bottom portion facing the light source; and
   a bottom chassis including a second bottom portion having a hole to receive the protrusion of the first bottom portion of the mold frame and a second sidewall portion facing the mold frame,
   wherein a first cross sectional area of a first opening of the hole corresponding to an inner surface of the bottom chassis and contacting the first surface of mold frame is different than a second cross sectional area of a second opening of the hole corresponding to an outer surface of the bottom chassis.

2. The backlight assembly of claim 1, wherein the first cross sectional area of the first opening of the hole is smaller than the second cross sectional area of the second opening of the hole.

3. The backlight assembly of claim 2, wherein a cross section of the hole has a trapezoidal shape.

4. The backlight assembly of claim 2, wherein the hole includes a first interior side surface adjacent to the first opening of the hole, a second interior side surface adjacent to the second opening of the hole and a third interior side surface connecting the first interior side surface and the second interior side surface.

5. The backlight assembly of claim 4, wherein the first interior side surface is aligned in a first direction substantially perpendicular to a plane defined by the first opening of the hole, the third interior side surface is aligned in a second direction substantially perpendicular to the first direction and the second interior surface is aligned with one of the first direction and a third direction having an angle having a range from about 0 degrees to about 180 degrees with respect to the first direction.

6. The backlight assembly of claim 4, wherein the first interior surface is aligned at an obtuse angle with respect to a plane defined by the first opening of the hole, the third interior side surface is aligned substantially parallel to the plane defined by the first opening of the hole and the second interior side surface is aligned at one of a right angle, an acute angle or an obtuse angle with respect to the third interior side surface.

7. The backlight assembly of claim 1, wherein a diameter of the first opening of the hole is smaller than a diameter of the second opening of the hole.

8. The backlight assembly of claim 1, wherein the bottom chassis is integrally formed with the mold frame.

9. The backlight assembly of claim 8, wherein the first bottom portion of the mold frame is in contact with an inner surface of the second bottom portion of the bottom chassis and an outer surface of the first sidewall portion of the mold frame is in contact with an inner surface of the second sidewall portion of the bottom chassis.

10. The backlight assembly of claim 8, wherein the first bottom portion of the mold frame is in contact with an inner surface of the second bottom portion of the bottom chassis and a part of the second sidewall portion of the bottom chassis is inserted into the first second sidewall portion of the mold frame.

11. The backlight assembly of claim 1, wherein the hole is formed adjacent to the light source.

12. A backlight assembly comprising:
a light source;
a mold frame disposed below the light source, having a substantially quadrangular shape and a protrusion on an outer surface; and
a bottom chassis disposed below the mold frame, having a bottom portion including a hole and a sidewall portion extending from the bottom portion toward the mold frame,
wherein the hole receives the protrusion, the protrusion having a stopper to prevent a separation of the protrusion from the hole,
wherein a part of the sidewall portion of the bottom chassis is inserted into the mold frame.

13. The backlight assembly of claim 12, wherein the bottom chassis is integrally formed with the mold frame.

14. The backlight assembly of claim 13, wherein the bottom chassis covers the mold frame.

15. A backlight assembly comprising:
a light source;
a mold frame disposed below the light source, having a substantially quadrangular shape and a protrusion on an outer surface; and
a bottom chassis disposed below the mold frame, having a bottom portion covering a rear surface of the mold frame and a sidewall portion extending from the bottom portion toward the mold frame,
wherein the sidewall portion has a hole to receive the protrusion, and a first cross sectional area of a first opening of the hole corresponding to an inner surface of the bottom chassis and contacting the mold frame is different than a second cross sectional area of a second opening of the hole corresponding to an outer surface of the bottom chassis.

16. A display apparatus comprising:
a light source;
a mold frame disposed below the light source and having a first bottom portion, a protrusion on a first surface of the first bottom portion and a first sidewall portion on a second surface of the first bottom portion opposite to the first surface of the first bottom portion, the second surface of the first bottom portion facing the light source;
a bottom chassis including a second bottom portion having a hole to receive the protrusion of the first bottom portion of the mold frame and a second sidewall portion facing the mold frame; and
a display panel disposed above the light source to display an image using a light supplied from the light source,
wherein a first cross sectional area of a first opening of the hole corresponding to an inner surface of the bottom chassis and contacting the first surface of the mold frame is different than a second cross sectional area of a second opening of the hole corresponding to an outer surface of the bottom chassis.

17. A display apparatus comprising:
a light source;
a mold frame disposed below the light source, having a substantially quadrangular shape and a protrusion on an outer surface;
a bottom chassis disposed below the mold frame, having a bottom portion including a hole and a sidewall portion extending from the bottom portion toward the mold frame; and
a display panel disposed above the light source to display an image using a light supplied from the light source,
wherein the hole receives the protrusion, the protrusion having a stopper to prevent a separation of the protrusion from the hole, and
wherein a part of the sidewall portion of the bottom chassis is inserted into the mold frame.

18. A display apparatus comprising:
a light source;
a mold frame disposed below the light source, having a substantially quadrangular shape and a protrusion on an outer surface;
a bottom chassis disposed below the mold frame, having a bottom portion covering a rear surface of the mold frame and a sidewall portion extending from the bottom portion toward the mold frame; and
a display panel disposed above the light source to display an image using a light supplied from the light source,
wherein the sidewall portion has a hole to receive the protrusion, and a first cross sectional area of a first opening of the hole corresponding to an inner surface of the bottom chassis and contacting the mold frame is different than a second cross sectional area of a second opening of the hole corresponding to an outer surface of the bottom chassis.

* * * * *